United States Patent Office 3,684,434
Patented Aug. 15, 1972

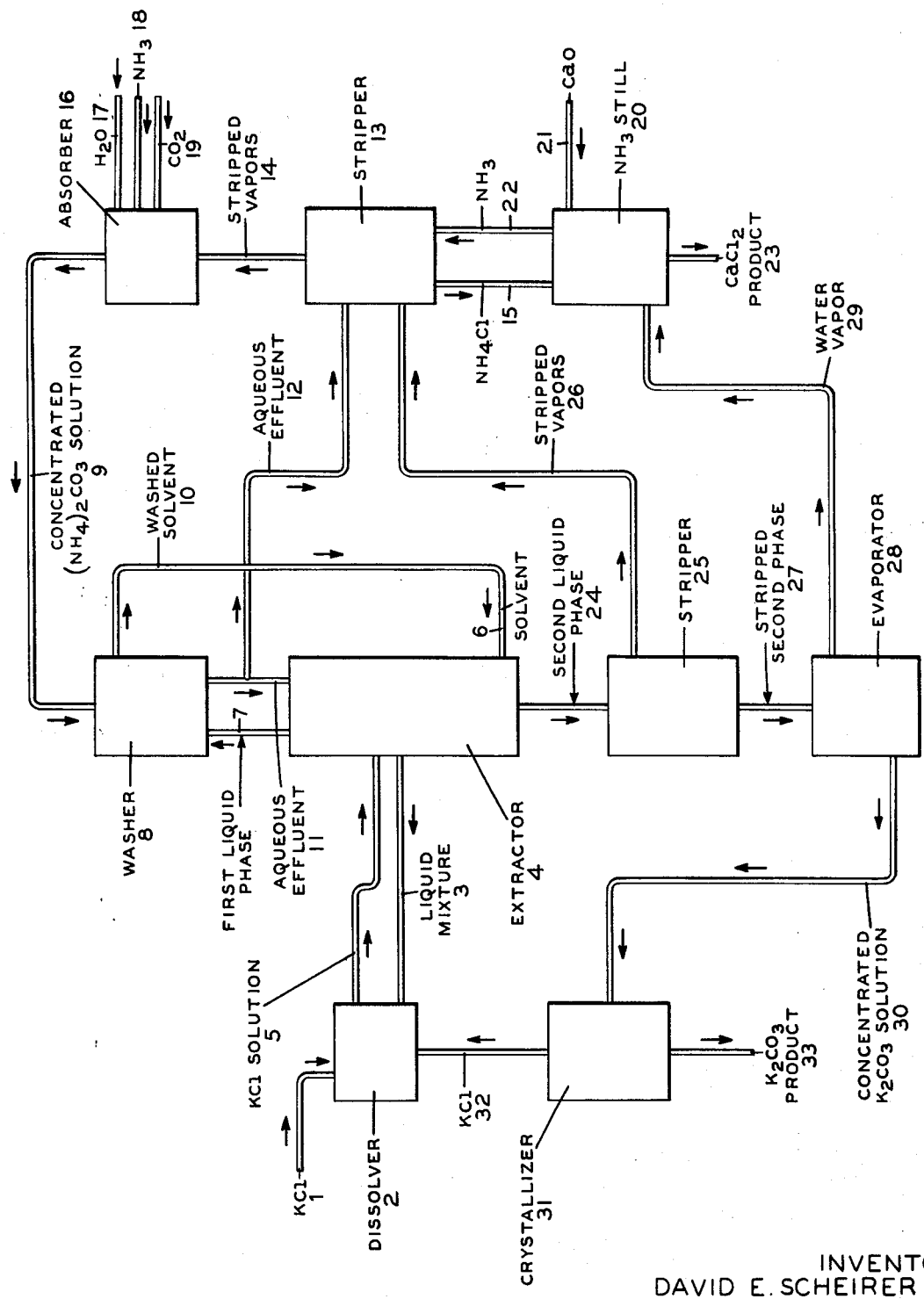

3,684,434
SOLVENT EXTRACTION PROCESS FOR SEPARATING WATER SOLUBLE IONIC COMPOUNDS
David E. Scheirer, Chester, and William Christian Klingelhoefer, Hopewell, Va., assignors to Allied Chemical Corporation, New York, N.Y.
Filed June 23, 1969, Ser. No. 835,638
Int. Cl. C01d 7/02, 11/00
U.S. Cl. 423—307                                                                11 Claims

ABSTRACT OF THE DISCLOSURE

In a metathesis reaction between water-soluble ionic salts containing polyvalent anion and monovalent anion by a solvent extraction process using water and water-miscible organic solvent to form two liquid phases in the presence of the salts, the organic solvent-rich phase containing the monovalent anion is washed with aqueous ammonium carbonate solution to remove the monovalent anion therefrom. The washed solvent is then returned to the reaction zone. A portion of the aqueous wash effluent is passed to the reaction zone to facilitate the metathesis reaction.

BACKGROUND OF THE INVENTION

This invention relates to a method of conducting a metathesis reaction between water-soluble ionic salts by solvent extraction, and in particular it relates to an improved method thereof where the organic solvent withdrawn from the reaction zone is efficiently regenerated for recycling back to the reaction zone.

When a plurality of ionic compounds are dissolved in water, an equilibrium mixture of the ionic components usually results, and in order for a metathesis, or double decomposition reaction, involving ionic compounds to proceed to completion in solution, it is necessary to upset the equilibrium and remove one of the products from the reaction. However, when both the starting materials and the products are soluble compounds, it has been very difficult if not impossible to conduct a metathesis reaction.

U.S. patent application Ser. No. 683,878 of Leland J. Beckham, filed Nov. 17, 1967, now U.S. Pat. No. 3,635,661, and entitled "Solvent Extraction Process for Separating Ionic Compounds" (assigned to the assignee of the instant application) teaches a method whereby a metathesis reaction between water-soluble salts can be carried to completion in solution in either direction, i.e., when a system has a predominant salt pair, the pair may be either reactants or products. According to the process of said Ser. No. 638,878, a metathesis reaction is conducted according to the equation:

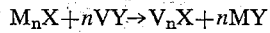

wherein M and V are different monovalent cations, X is a polyvalent anion, Y is a monovalent anion and $M_nX$, VY, $V_nX$, and MY are each water-soluble salts, and $n$ is an integer of 2 to 5. The basic process involves a reaction between water-soluble salts containing polyvalent anion and monovalent anion which comprises dissolving said salts into a solvent mixture consisting essentially of water and a water-miscible organic liquid, the quantity of dissolved salt being effective to cause the separation of the solvent mixture into two liquid phases, a phase rich in water and a phase rich in said organic liquid, whereby polyvalent anion is selectively extracted into the organic liquid rich phase, and separating the two liquid phases. The steps of a preferred embodiment of the process include:

(a) Introducing $M_nX$ and water into a reaction zone;
(b) Introducing VY into said reaction zone at a point remote from the introduction of $M_nX$;
(c) Introducing a water-miscible organic solvent into said reaction zone at a point remote from the introduction of $M_nX$;
(d) Passing said $M_nX$ and water countercurrent to and in intimate contact with said VY and said organic solvent in said reaction zone, to effect a net flow of anion X opposite to the net flow of anion Y and to maintain a sufficient concentration of $M_nX$ and VY in the resultant mixture of water and organic solvent to cause formation of two liquid phases, a first phase rich in said organic solvent and a second phase rich in water, whereby anion Y is selectively extracted in the organic solvent-rich first phase and anion X is selectively extracted in the water-rich second phase;
(e) Withdrawing said organic solvent-rich first phase containing MY from said reaction zone; and
(f) Withdrawing said water-rich second phase containing $V_nX$ from said reaction zone.

One disadvantage of this process is that it consumes substantial quantities of the water-miscible organic solvent, so that without recycling the solvent back into the reaction zone the method becomes economically prohibitive. However, when the organic solvent-rich first phase is withdrawn from the reaction zone during the process it is unfit for recycling. Heretofore, in order to regenerate the solvent for recycle it has been necessary to distill it or subject it to some other equally time consuming and costly regeneration step such as crystallization.

Furthermore, in a few instances, the salt does not effect a separation of the solvent mixture into two phases, either because the salt is present in insufficient concentration, especially in the polyvalent anion stripping zone which is employed to remove the polyvalent anion from first liquid phase prior to withdrawal thereof from the reaction zone, or because of its poor salting-out characteristic. In the event that the two phases do not separate, a minor amount of water-immiscible solvent or another salt is added.

SUMMARY OF THE INVENTION

According to the instant invention, in the method of conducting a metathesis reaction in the manner of said Ser. No. 683,878 according to the equation:

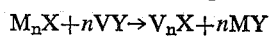

wherein M, V, X, Y, and $n$ are as aforesaid, by passing $M_nX$ and VY into a reaction zone containing a solvent mixture consisting essentially of water and a water-miscible organic solvent, the quantity of dissolved salts being sufficient to effect separation of the solvent mixture into two liquid phases, a first phase relatively rich in the organic solvent and a second phase rich in water, whereby polyvalent anion is selectively extracted into the water-rich phase and monovalent anion is selectively extracted into the organic-solvent rich phase, and separating the two liquid phases, it has now been found that the organic solvent can be efficiently regenerated for recycle into the reaction zone by washing the organic solvent-rich first phase with a concentrated aqueous ammonium carbonate solution. By means of this washing step, the other components found in the first liquid phase, especially MY, are substantially separated from the organic solvent, thereby doing away with the need of further steps to regenerate the solvent for recycle.

In addition it has been found that passing a portion of aqueous effluent from the washing step back into the reaction zone adjacent the point from which the organic solvent-rich first liquid phase is withdrawn is beneficial since it helps to remove undesired V cations and X anions from the first liquid phase prior to withdrawal thereof from the reaction zone. Furthermore, in those instances where the salt does not affect a separation of the solvent mixture into two liquid phases, passing a portion of the aqueous wash effluent into the reaction zone in this manner obviates the hereinbefore mentioned need of adding a water-immiscible solvent or additional salt.

The ammonium carbonate used in the wash step is recovered by stripping the remaining portion of aqueous effluent from the wash step and may then be recycled back into the process.

BRIEF DESCRIPTION OF THE DRAWING

For a better understanding of the instant invention, reference is made to the accompanying drawing wherein The figure illustrates a flow diagram of the instant process.

DETAILED DESCRIPTION OF THE INVENTION

The instant process, constituting an improvement over that of said Ser. No. 683,878, is illustrated by the reaction of

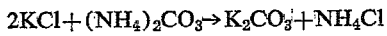
$$2KCl + (NH_4)_2CO_3 \rightarrow K_2CO_3 + NH_4Cl$$

Referring to the figure, KCl 1 is dissolved in dissolver 2 in liquid mixture 3 which is drawn from an intermediate stage of extractor 4. The resulting KCl solution 5 is returned to extractor 4 at the same intermediate stage. Extractor 4 consists of a plurality of mixer-settler units arranged for countercurrent flow.

Solvent 6 enters extractor 4 at the first stage and passes through the extractor to be withdrawn at the final stage as solvent-rich first liquid phase 7, which passes thence to washer 8. In washer 8, which consists of a plurality of mixer-settler units similar to those of extractor 4, first phase 7 is passed countercurrent to concentrated aqueous ammonium carbonate solution 9. Regenerated solvent 10 which then exits washer 8 is recycled to extractor 4 as a source of solvent 6.

A portion of the aqueous effluent 11 from washer 8 is passed into the final stage of extractor 4, to serve not only as a source of ammonium carbonate for the overall metathesis reaction, but also as an inducer of phase separation and as a wash solution to remove potassium ions from the first phase 7 prior to withdrawal thereof from extractor 4.

The remaining portion of the aqueous effluent 12 is sent to stripper 13, where organic solvent, carbon dioxide and ammonia are removed as stripped vapors 14, leaving behind an aqueous solution of NH$_4$Cl 15. Stripped vapors 14 are sent to absorber 16, where they are mixed with water 17 and additional ammonia 18 and carbon dioxide 19 to produce concentrated aqueous ammonium carbonate solution 9.

Aqueous NH$_4$Cl solution 15 exits stripper 13 and passes to ammonia still 20, where it is treated with lime 21 to produce ammonia 22, which is returned to stripper 13, and aqueous calcium chloride solution 23, which is collected as product.

The second liquid phase 24 which is formed in extractor 4 is passed to stripper 25, where organic solvent, carbon dioxide and ammonia are removed as stripper vapors 26. These stripped vapors 26 are passed to stripper 13, or alternatively directly to absorber 16. The stripped second phase 27 which exits stripper 25 is sent to evaporator 28 where its water content is reduced. The removed water vapor 29 is conveniently passed into ammonia still 20 as a source of heat.

From evaporator 28, concentrated K$_2$CO$_3$ solution 30 is sent to crystallizer 31, where KCl crystallizes from the solution. Solid KCl 32 is then recycled to dissolver 2 and aqueous K$_2$CO$_3$ solution 33 is collected as product.

Considerations and techniques disclosed in said Ser. No. 683,878 with regard to assembly and operation of the extractor and manner of adding the various materials thereto are equally relevant in the instant improved process. Thus, the number of extraction stages employed will vary with the strength of the separating force of the particular metathesis reaction being conducted and with the degree of separation desired. Usually at least 5 stages will be employed, preferably between about 15 and 40 stages. About 5-20 stages will be below the VY feed point and will serve as the Y stripping zone. About 10-20 stages will preferably be situated above the VY feed point to serve as V stripping zone. By extraction stages it is understood that the stages may be actual or theoretical stages. In the extractor, which normally operates at about 30–40° C., the heat of reaction is negligible and settling requires at least about one minute. Preferably, at least about 6 volumes of aqueous wash effluent is added to the last stage of the extractor as reflux for each 100 volumes of solvent in order to remove substantially all V cation from the exiting first liquid phase. In the lower part of the extractor at least about 50% of the Y anion is removed from the exiting second liquid phase, preferably 90% or more.

For ease of operation, VY is first dissolved so that it can be added to the extractor in solution form. For this purpose, solution is withdrawn from an intermediate stage of the extractor, heated to about 30–60° C. and VY then added. Usually only part of the salt will dissolve, so the excess is settled prior to returning the solution to the same stage from which it had been withdrawn. The two liquid phases partially separate prior to being returned to the extractor.

The washer consists of a plurality of mixer-settler units similar to those of the extractor, preferably numbering between about 5 and 15. Here the first liquid phase is passed countercurrent to a concentrated aqueous ammonium carbonate solution, which preferably contains between about 25 and 45% by weight ammonium carbonate. Normally between about 10 and 25 volumes of ammonium carbonate solution are used for each 100 volumes of first liquid phase in order to reduce the level of MY in the phase to a low enough level to permit immediate recycle of the solvent. Preferably the level of MY in the washed solvent will be less than 0.1% by weight.

The portion of the aqueous effluent from the washer which is not used as reflux in the extractor is stripped of ammonium carbonate and organic solvent by means of a conventional stripper which will normally contain about 10 or more plates. These stripped vapors are then mixed with make-up ammonia, carbon dioxide and water to produce the ammonium carbonate solution employed in the washer. The absorber is typically operated at about 20–30° C. and slightly elevated pressures to assist formation of the solution.

After removal of the stripped vapors from aqueous wash effluent, an aqueous solution of MY is obtained. This salt is one of the two products of the metathesis reaction and may be used as desired. For example, it may be used in aqueous solution as obtained from the stripper, it may be isolated by distillation, crystallization, etc., or it may be further reacted to provide a more desired material.

The second liquid phase which exits the first stage of the extractor is rich in water and V$_n$X, the other product of the metathesis reaction. However, it also contains relatively minor amounts of the organic solvent, ammonium carbonate and Y anion so that purification may be desirable. This can be effected by any of the conventional techniques with which those skilled in the art are familiar but it has been found to be especially convenient to first strip ammonia, carbon dioxide and solvent therefrom with steam. It is advantageous to use heat during the stripping process to avoid dilution of the solution.

The stripped first liquid phase may then be concentrated by evaporation at reduced pressure. However, it is preferred to use a plurality of evaporators in cascade so that only a portion of the water is vaporized at the highest concentration. Crystallization and removal of VY can then be readily accomplished leaving a relatively pure solution of V$_n$X product. This may be utilized in any desirable manner.

In conducting the instant process, any organic solvent can be used which is miscible with water and inert to the salts involved in the metathesis reaction. Preferred solvents include 2-propanol, ethanol, 2-ethoxyethanol, n-propanol, t-butanol, etc. 2-propanol is especially preferred.

Cations M and V are monovalent metallic ions such as sodium ($Na^+$), potassium ($K^+$), ammonium ($NH_4^+$) or lithium ($Li^+$). Anion Y is a monovalent water soluble anion, for example, fluoride ($F^-$), chloride ($Cl^-$), bromide ($Br^-$), iodide ($I^-$), nitrate ($NO_3^-$), monobasic phosphate ($H_2PO_4^-$), acetate ($CH_3CO_2^-$), formate ($HCO_2^-$) or thiocyanate ($SCN^-$); and anion X is a polyvalent water soluble anion, for example, an anion having a valency of 2 to 5, such as dibasic phosphate ($HPO_4^=$), carbonate ($CO_3^=$), thiosulfate ($S_2O_3^=$), sulfate ($SO4^=$), dibasic pyrophosphate ($H_2P_2O_7^=$), tribasic tripolyphosphate ($H_2P_3O_{10}^{3-}$), dibasic citrate ($C_6H_6O_7^=$), tribasic citrate ($C_6H_5O_7^{3-}$), tetrabasic tetrapolyphosphate ($H_2P_4O_{13}^{4-}$), tribasic pyrophosphate ($HP_2O_7^{3-}$), tetrabasic tripolyphosphate ($HP_3O_{10}^{4-}$), and pentabasic tetrapolyphosphate ($HP_4O_{13}^{5-}$).

The instant invention is very effectively employed when MY, one of the products of the metathesis reaction, is ammonium chloride or ammonium bromide since separation of the two liquid phases will not occur with these products unless assisted by the addition of a water-immiscible solvent or extra salt. By adding the aqueous wash effluent to the reactor as reflux in the hereinbefore described manner, phase separation is very effectively induced due to the presence of ammonium carbonate in the effluent. Therefore, in a preferred embodiment of the instant invention, M is ammonium ion and Y is chloride or bromide anion. More preferably, Y is chloride. In a further preferred embodiment of this invention X is carbonate anion so that by adding aqueous wash effluent to the reactor for inducing phase separation, one of the two salt reactants in the metathesis reaction is being added also.

The selection of ammonium carbonate as solute in the was solution in the instant invention is also influenced by the efficiency which it permits. Since the solute is carried along in the aqueous effluent exiting the washer, along with MY, it must be readily recoverable to permit facile isolation of MY and also permit efficient recycle of the solute. For this reason, ammonium carbonate, which can be removed from the aqueous effluent by stripping, is preferred.

The following examples are provided to illustrate the instant invention more fully. They are provided for illustrative purposes only and are not to be construed as limiting the invention, which is defined by the appended claims. Thus, it will be clear to those skilled in the art that variations and departures from the procedures illustrated in the examples can be made while still practicing the invention. In the examples, unless indicated to the contrary, all flows are furnished in pounds per hour, percentages are by weight and ammonium carbonate is shown as equivalent ammonia and carbon dioxide.

Example 1

A 25-stage extractor, consisting of mixer-settler units arranged for countercurrent flow, is operated at 30–40° C. Solvent, entering the first stage at a rate of 16,000 pounds per hour, has the following composition:

|  | Percent |
|---|---|
| 2-propanol | 70 |
| Water | 27 |
| $CO_2$ | 1 |
| $NH_3$ | 2 |
| $NH_4Cl$ | 0.05 |

About 300 pounds per hour of KCl are added at the fifteenth stage of the reactor.

Aqueous effluent from the washer described hereinafter is added to the twenty-fifth stage of the extractor as reflux at a rate of 1616 pounds per hour. The aqueous effluent has the following composition:

| Water | 1000 |
|---|---|
| 2-propanol | 162 |
| $CO_2$ | 206 |
| $NH_3$ | 160 |
| $NH_4Cl$ | 88 |

The first liquid phase, rich in 2-propanol and ammonium chloride and having a density of 0.84, is withdrawn from the twenty-fifth stage at a rate of about 16,000 pounds per hour. This first liquid phase has the following composition:

|  | wt. percent |
|---|---|
| 2-propanol | 67.9 |
| Water | 25.6 |
| $NH_4Cl$ | 1.2 |
| $NH_3$ | 3.1 |
| $CO_2$ | 2.2 |

It is then passed into an eight-stage washer where it is passed countercurrent to an aqueous ammonium carbonate solution having the following composition:

| Water | 2300 |
|---|---|
| $NH_3$ | 400 |
| $CO_2$ | 516 |
| 2-propanol | 343 |

The resulting washed first liquid phase is returned to the extractor as aforesaid solvent at the rate of 16,000 pounds per hour. Also returned to the extractor in the hereinbefore described manner is 1616 pounds per hour of the aqueous effluent from the washer.

The remainder of the aqueous effluent from the washer, having the following composition:

| Water | 1250 |
|---|---|
| 2-propanol | 203 |
| $CO_2$ | 258 |
| $NH_3$ | 200 |
| $NH_4Cl$ | 110 | is passed to a 10-plate stripper operated at 5–10 p.s.i.g. Heat for the stripper is supplied by vapors from the hereinafter described ammonia still. Also supplied to this stripper are the vapors stripped from the second liquid phase in the hereinafter described manner, which have the following composition:

| $CO_2$ | 213 |
|---|---|
| $NH_3$ | 165 |
| 2-propanol | 140 |
| Water | 464 |

The vapors exiting said 10-plate stripper are passed to an absorber, operated at 0–5 p.s.i.g., where they are mixed with additional $NH_3$, $CO_2$ and water to provide an aqueous ammonium carbonate solution having the following composition:

| Water | 2300 |
|---|---|
| $NH_3$ | 400 |
| $CO_2$ | 516 |
| 2-propanol | 343 |

This solution is then used to wash the first liquid phase in the hereinbefore described manner. Little makeup $NH_3$ is required but about 43 pounds per hour of $CO_2$ are needed to compensate for $CO_2$ removed from the process as product $K_2CO_3$. Heat is removed from the absorber to maintain the temperature at about 30° C.

The $NH_4Cl$ solution remaining after removal of vapors in said 10-stage stripper, is treated with 61 pounds per hour of lime to form $NH_3$, which is distilled out and returned to said stripper, and $CaCl_2$ solution which is recovered as product.

The second liquid phase formed in the extractor is withdrawn from the first stage thereof. This phase has the following compositions, on a weight percent basis:

| | |
|---|---:|
| $K^+$ | 6.4 |
| $Cl^-$ | 1.5 |
| $CO_2$ | 14.7 |
| $NH_3$ | 9.5 |
| 2-propanol | 8.0 |
| Water | 72.9 | and a density of 1.1. The second liquid phase is stripped of its $CO_2$, $NH_3$ and 2-propanol content by steam in a stripper operated at 118° C. The stripped vapors are passed to the stripper where the aqueous wash effluent is stripped in the hereinbefore described manner. Indirect heat is used in the 118° C. stripper to avoid dilution of the first liquid phase. At this time, any $KHCO_3$ in the first liquid phase is converted to $K_2CO_3$.

The stripped first liquid phase is then evaporated to 53% $K_2CO_3$ using two evaporators in cascade, operating at 134° C. and 10 p.s.i.g. The water vapor removed thereby is used to supply heat to aforesaid $NH_3$ still. The resulting hot solution passes from the evaporator to a crystallizer operating at 50° C., where the KCl contained in the solution crystallizes. It is removed by centrifugation and returned to aforesaid KCl solution which is added to the extractor. The remaining clear product solution has the following composition:

| | |
|---|---:|
| $K_2CO_3$ | 143 |
| KCl | 4 |
| Water | 121 |

Example 2

The extraction and washing process of Example 1 are substantially repeated with the following departures to conduct a metathesis reaction according to the equation:

$$2KCl + (NH_4)_2HPO_4 \rightarrow K_2HPO_4 + 2NH_4Cl$$

Chief object is to obtain a solution containing $K_2HPO_4$ from a feed containing KCl and $(NH_4)_2HPO_4$. In this example the KCl and $(NH_4)_2HPO_4$ are added together at one point in the extractor; however, it is apparent that they may be added at separate points as taught in said Ser. No. 683,878.

The extractor consists of 25 mixer-settler units arranged for countercurrent extraction. The last six stages of the extractor actually serve as the washer, so that the solvent exiting the twenty-fifth stage is immediately recycled to the first stage. The recycled solvent has the following approximate composition:

| | wt. percent |
|---|---:|
| 2-propanol | 70 |
| Water | 27 |
| $CO_2$ | 1 |
| $NH_3$ | 2 |

It contains only trace amounts of chloride and practically no potassium or phosphate.

The solvent is continuously fed to stage one of the extractor at the rate of 960 grams per hour, including about 36 grams per hour of make-up solvent. At stage 9, 79 grams per hour of an aqueous solution containing 20 weight percent KCl and 17.7 weight percent $(NH_4)_2HPO_4$ is continuously fed into the extractor. About 198 grams per hour of an aqueous solution of ammonium carbonate (equivalent to 13.9 weight percent $NH_3$ and 18 weight percent $CO_2$) is continuously fed into the extractor at stage 25.

The following product streams are continuously removed from the extractor. The aqueous $K_2HPO_4$ product stream from stage one amounts to 135.9 grams per hour and analyzes 1.3 weight percent $Cl^-$, 6 weight percent $K^+$, 5.5 weight percent $P_2O_5$, plus about 8 weight percent 2-propanol, 15 weight percent $NH_3$, and 11 weight percent $CO_2$. The alcohol, $NH_3$ and $CO_2$ is recovered from this stream by conventional stripping procedures. The aqueous phase from the washer section is removed at stage 19. This material is divided into two streams; about 161 grams per hour is fed back to the extractor at stage 18 to serve as reflux, and the remainder is taken as by-product stream amounting to about 177 grams per hour analyzing 3.1 weight percent $Cl^-$, 0.04 weight percent $K^+$ and 0.0 weight percent $P_2O_5$ plus 2-propanol, $NH_3$ and $CO_2$ that is recovered by conventional stripping procedures. The residual stream contains essentially $NH_4Cl$.

We claim:
1. In the method of conducting a metathesis reaction according to the equation:

$$M_nX + nVY \rightarrow V_nX + nMY$$

wherein M and V are monovalent cations; X is a polyvalent anion; Y is a monovalent anion; $M_nX$, VY, $V_nX$ and MY are each water-soluble salts; and $n$ is an integer of 2 to 5, by passing $M_nX$ and VY into a reaction zone containing a solvent mixture consisting essentially of water and a water-miscible organic solvent the quantity of dissolved salts being sufficient to effect separation of the solvent mixture into two liquid phases, a first phase relatively rich in the organic solvent and a second phase rich in water, whereby polyvalent anion is selectively extracted into the water rich phase and monovalent anion is selectively extracted into the organic solvent rich phase, and separately withdrawing said liquid phases from the reaction zone, the improvement which comprises:
  washing the organic solvent-rich first liquid phase with concentrated aqueous ammonium carbonate solution to form an aqueous phase containing the MY and a solvent phase, from which the MY has been removed, separating the two phases and thereafter recycling the resulting washed solvent to said reaction zone.

2. The improved method of claim 1 wherein said concentrated aqueous ammonium carbonate solution comprises between about 25 and 45 weight percent ammonium carbonate.

3. The improved method of claim 1 wherein said organic solvent-rich first liquid phase is washed with between about 10 and 25 volumes of said ammonium carbonate solution per 100 volumes of said first liquid phase.

4. The improved method of claim 1 which additionally comprises passing a portion of the aqueous effluent from the washing step into said reaction zone adjacent the point from which said organic solvent-rich first liquid phase is withdrawn therefrom.

5. The improved method of claim 4 wherein at least about 6 volumes of said aqueous effluent are passed into said reaction zone per 100 volumes of said first liquid phase withdrawn therefrom.

6. The improved method of claim 4 which additionally comprises stripping carbon dioxide, ammonia and said organic solvent from the remaining portion of said aqueous effluent to provide an aqueous solution of MY and stripped vapors, and recycling said stripped vapors into said concentrated aqueous ammonium carbonate solution.

7. The improved method of claim 4 wherein said organic solvent is 2-propanol.

8. The improved method of claim 4 wherein MY is ammonium chloride and the portion of said aqueous effluent passed into said reaction zone is sufficient to induce separation of said first and second liquid phases.

9. The improved method of claim 4 wherein $M_nX$ is $(NH_4)_2CO_3$ and VY is KCl.

10. The improved method of claim 4 wherein $M_nX$ is $(NH_4)_2HPO_4$ and VY is KCl.

11. In the method for carrying out a metathesis reaction according to the equation:

$$M_nX + nVY \rightarrow V_nX + nMY$$

wherein M and V are monovalent cations; X is a polyvalent anion and Y is a monovalent anion, $M_nX$, VY, $V_nZ$ and MY are each water-soluble salts and $n$ is an integer of 2 to 5 by (a) introducing $M_nX$ and water into a reaction zone,
(b) introducing VY into said reaction zone at a point remote from the introduction of $M_nX$,
(c) introducing a water-miscible organic solvent into said reaction zone at a point remote from the introduction of $M_nX$,
(d) passing said VY and said organic solvent countercurrent to and in intimate contact with said $M_nX$ and said water in said reaction zone, to effect a new flow of anion X opposite to the net flow of anion Y, and to maintain a sufficient concentration of $M_nX$ and VY in the resultant mixture of water and organic solvent to cause formation of two liquid phases, a phase rich in said organic solvent and a phase rich in water, whereby anion Y is selectively extracted in the organic solvent rich phase and anion X is selectively extracted in the water rich phase,
(e) withdrawing said organic solvent rich phase containing MY from said reaction zone, and
(f) withdrawing said water rich phase containing $V_nX$ from said reaction zone,
(g) washing said organic solvent rich phase containing MY with concentrated aqueous ammonium carbonate solution to form an aqueous phase containing the MY and a solvent phase from which the MY has been removed,
(h) separating the two phases,
(i) recycling the resulting washed solvent to said reaction zone, and
(j) passing a portion of the aqueous effluent from the washing step into said reaction zone adjacent the point from which said organic solvent rich phase is withdrawn therefrom.

References Cited
UNITED STATES PATENTS

| | | | |
|---|---|---|---|
| 2,767,051 | 10/1956 | Fellows et al. | 23—63 |
| 2,900,223 | 8/1959 | Cunningham | 23—63 |

OSCAR R. VERTIZ, Primary Examiner

G. O. PETERS, Assistant Examiner

U.S. Cl. X.R.

423—422, 499